(12) United States Patent
Takahashi

(10) Patent No.: US 11,245,441 B2
(45) Date of Patent: Feb. 8, 2022

(54) RADAR DEVICE

(71) Applicant: Mitsubishi Electric Corporation, Tokyo (JP)

(72) Inventor: Ryuhei Takahashi, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 0 days.

(21) Appl. No.: 16/967,296

(22) PCT Filed: Feb. 9, 2018

(86) PCT No.: PCT/JP2018/004676
§ 371 (c)(1),
(2) Date: Aug. 4, 2020

(87) PCT Pub. No.: WO2019/155625
PCT Pub. Date: Aug. 15, 2019

(65) Prior Publication Data
US 2021/0028826 A1  Jan. 28, 2021

(51) Int. Cl.
*H04B 7/04* (2017.01)
*H04B 7/0413* (2017.01)
*G01S 7/282* (2006.01)
*H04B 7/06* (2006.01)

(52) U.S. Cl.
CPC ............ *H04B 7/0413* (2013.01); *G01S 7/282* (2013.01); *H04B 7/0689* (2013.01)

(58) Field of Classification Search
CPC .. H04B 1/7097; H04B 7/0413; H04B 1/0475; H04B 7/0617; H04B 7/04; H04B 7/0689; H04B 7/086; G01S 7/282; G01S 13/5244
See application file for complete search history.

(56) References Cited

U.S. PATENT DOCUMENTS

2018/0166794 A1* 6/2018 Raphaeli ............... G01S 13/347

FOREIGN PATENT DOCUMENTS

| JP | 19-288659 A | 10/1998 |
| JP | 2011-158430 A | 8/2011 |
| JP | 2016-90432 A | 5/2016 |

OTHER PUBLICATIONS

Carlson, "Covariance Matrix Estimation Errors and Diagonal Loading in Adaptive Arrays," IEEE Transactions on Aerospace and Electronic Systems, vol. 24. No. 4, Jul. 1, 1988, pp. 397-401, XP055163857.

(Continued)

*Primary Examiner* — Rahel Guarino
(74) *Attorney, Agent, or Firm* — Birch, Stewart, Kolasch & Birch, LLP

(57) ABSTRACT

A correlation matrix calculating unit calculates an unnecessary signal correlation matrix. A diagonal load processing unit performs diagonal load processing on the unnecessary signal correlation matrix. A window function calculating unit calculates a window function for obtaining a side lobe characteristic that reduces unnecessary signals on the basis of an unnecessary signal correlation matrix R after the diagonal load processing. A window function applying unit applies the window function to a reception signal vector. A beam forming unit forms a MIMO beam on the basis of the reception signal vector to which the window function is applied and a beam directivity angle.

2 Claims, 5 Drawing Sheets

(56) References Cited

OTHER PUBLICATIONS

Dai et al., "Low-sidelobe HRR profiling based on the FDLFM-MIMO radar." Synthetic Aperture Radar, 1st Asian and Pacific Conference on Nov. 1, 2007, pp. 132-135, XP055630732.
Extended European Search Report for European Application No. 18904516.4, dated Dec. 8, 2020.
Ganz et al., "Convergence of the SMI and the Diagonally Loaded SMI Algorithms with Weak Interference," IEEE Transactions on Antennas and Propagation, vol. 38, No. 3. Mar. 1, 1990, pp. 394-399, XP000126901.
Sirianunpiboon, "A Novel Alternative to Diagonal Loading for Robust Adaptive Beamforming," Signal Processing and its Applications, Proceedings of the Eight H International Symposium on Sydney, Australia, Aug. 28-31, 2005, vol. 1, Aug. 28, 2005, pp. 399-402, XP010885464.
Robey et al., "MIMO Radar Theory and Experimental Results", Conference Record of the Thirty-Eighth Asilomar Conference on Signals Systems & Computers, Nov. 2004, pp. 300-304.
European Office Action for European Application No. 18 904 516.4, dated Sep. 22, 2021.

\* cited by examiner

RADAR DEVICE

TECHNICAL FIELD

The present invention relates to a multiple input multiple output (hereinafter, referred to as MIMO) radar device.

BACKGROUND ART

Conventionally, there has been known a technique in which a plurality of transmission antennas transmit transmission signals different from each other, receive reflection signals formed by reflection of the transmission signals off an object, and thereby forms a MIMO beam. Note that formation of the MIMO beam corresponds to formation of a transmission beam and formation of a reception beam with respect to a reception signal.

A MIMO beam pattern obtained by forming the MIMO beam matches a transmission/reception product beam that is a product of a transmission beam pattern from a transmission antenna and a reception beam pattern from a reception antenna. In a conventional MIMO beam pattern, a transmission angle of a reflection signal (hereinafter, referred to as DOD angle) and an arrival angle of the reflection signal (hereinafter, referred to as DOA angle) are the same as each other, and it is assumed that the reflection signal is a directly propagated reflection signal.

For example, Patent Literature 1 describes a method for reducing side lobes of a MIMO beam pattern using a window function in order to reduce unnecessary reflection signals due to direct propagation (hereinafter, referred to as direct propagation clutters) included in a reception signal of a MIMO radar device.

CITATION LIST

Patent Literatures

Patent Literature 1: JP 2016-90432 A

SUMMARY OF INVENTION

Technical Problem

A reception signal of an actual MIMO radar device also includes an unnecessary reflection signal due to multipath propagation (hereinafter, referred to as multipath clutter) in addition to the direct propagation clutter.

However, the radar device described in Patent Literature 1 cannot reduce multipath clutters included in a reception signal disadvantageously because the multipath clutters are not considered.

The present invention solves the above problem, and an object of the present invention is to provide a radar device capable of reducing direct propagation clutters and multipath clutters included in a reception signal.

Solution to Problem

A radar device according to the present invention includes N transmission signal generating units, wherein N indicates two or more, N transmission antennas, M reception antennas, wherein M indicates two or more, M matched filter banks, a correlation matrix calculating unit, a diagonal load processing unit, a window function calculating unit, a window function applying unit, and a beam forming unit. The N transmission signal generating units generate transmission signals different from each other. The N transmission antennas are connected to the N transmission signal generating units one by one, and transmit transmission signals. The M reception antennas receive reflection waves of the transmission signals transmitted from the N transmission antennas, the reflection waves being formed by reflection off an object. The M matched filter banks are connected to the M reception antennas one by one, and each output a reception signal vector that is an output of a matched filter using the transmission signal generated by each of the N transmission signal generating units as a replica of the matched filter. The correlation matrix calculating unit calculates an unnecessary signal correlation matrix using a steering vector of an unnecessary signal defined on the basis of a DOD angle of the unnecessary signal and a DOA angle of the unnecessary signal. The diagonal load processing unit performs diagonal load processing on the unnecessary signal correlation matrix calculated by the correlation matrix calculating unit using a diagonal load amount, and calculates an unnecessary signal correlation matrix after the diagonal load processing. The window function calculating unit calculates a window function for obtaining a side lobe characteristic that reduces unnecessary signals on the basis of the unnecessary signal correlation matrix after the diagonal load processing, calculated by the diagonal load processing unit. The window function applying unit multiplies the reception signal vector output from the M matched filter banks by the window function calculated by the window function calculating unit, and outputs a reception signal vector to which the window function is applied. The beam forming unit forms a MIMO beam on the basis of the reception signal vector output from the window function applying unit and a beam directivity angle.

Advantageous Effects of Invention

According to the present invention, a window function is derived on the basis of a principle of suppressing reflection signals belonging to a subspace of a space defined by steering vectors of direct propagation clutters and multipath clutters to be reduced. By using this window function, the radar device can reduce direct propagation clutters and multipath clutters included in a reception signal.

DESCRIPTION OF EMBODIMENTS

Hereinafter, in order to describe the present invention in more detail, an embodiment for carrying out the present invention will be described with reference to the attached drawings.

First Embodiment

Figure 1:
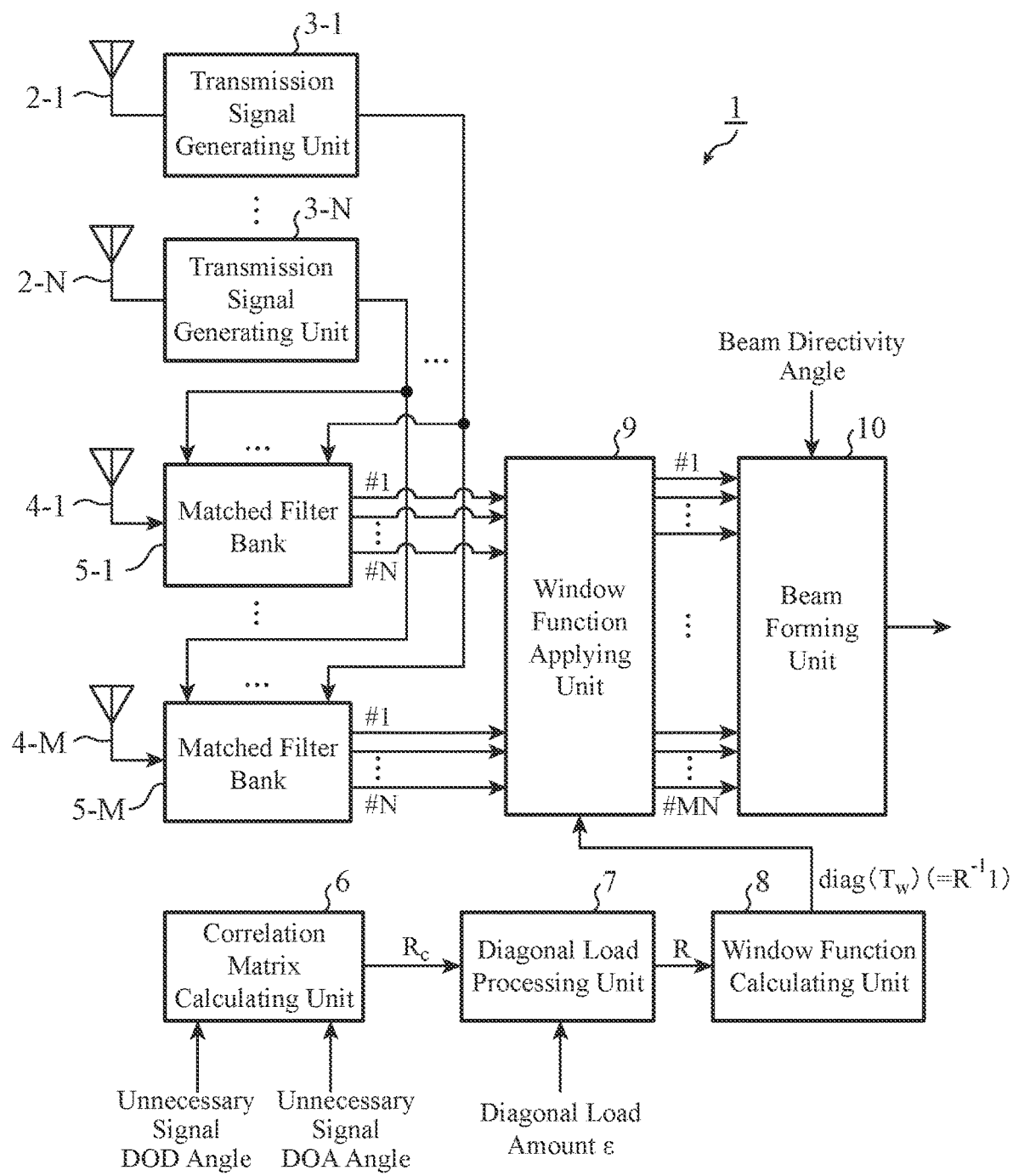
FIG. 1 is a block diagram illustrating a configuration of a radar device according to a first embodiment of the present invention.

FIG. 1 is a block diagram illustrating a configuration of a radar device 1 according to a first embodiment of the present invention. The radar device 1 is a MIMO radar device, and includes a transmitting system, a receiving system, and a signal processing unit. The transmitting system includes N transmission antennas 2-1 to 2-N where N indicates two or more and N transmission signal generating units 3-1 to 3-N, and the receiving system includes M reception antennas 4-1 to 4-M where M indicates two or more and M matched filter banks 5-1 to 5-M. The signal processing unit includes a correlation matrix calculating unit 6, a diagonal load processing unit 7, a window function calculating unit 8, a window function applying unit 9, and a beam forming unit 10.

As illustrated in FIG. 1, the transmission signal generating units 3-1 to 3-N are connected to the N transmission antennas 2-1 to 2-N one by one. The transmission signal generating units 3-1 to 3-N generate transmission signals different from each other. These transmission signals are separated by each of the M matched filter banks 5-1 to 5-M, and therefore are desirably orthogonal to each other.

The transmission antennas 2-1 to 2-N transmit transmission signals generated by the transmission signal generating units 3-1 to 3-N, respectively. Each of the transmission signal generating units 3-1 to 3-N is also connected to each of the M matched filter banks 5-1 to 5-M. N transmission signals generated by the N transmission signal generating units 3-1 to 3-N are output to each of the matched filter banks 5-1 to 5-M.

As illustrated in FIG. 1, the matched filter bank 5-1 to 5-M are connected to the reception antennas 4-1 to 4-M one by one. The reception antennas 4-1 to 4-M receive reflection waves of transmission signals transmitted from the N transmission antennas 2-1 to 2-N, and output the reflection waves to the matched filter banks 5-1 to 5-M. The reflection waves of transmission signals are reflection waves propagated toward the radar device 1 by reflection of transmission signals transmitted from the transmission antennas 2-1 to 2-N off an object present outside the radar device 1.

Each of the M matched filter banks 5-1 to 5-M outputs a reception signal vector that is an output of a matched filter using N transmission signals generated by the N transmission signal generating units 3-1 to 3-N, respectively, as a replica of the matched filter.

A reception signal received by each of the reception antennas 4-1 to 4-M includes a mixture of reflection waves derived from N transmission signals. Each of the matched filter banks 5-1 to 5-M separates a reception signal into N reflection wave reception signals. In this separation process, a matched filter is used. Each of the matched filter banks 5-1 to 5-M uses N transmission signals generated by the transmission signal generating units 3-1 to 3-N, respectively, as a replica of a matched filter. Since a reception signal received by one matched filter bank is separated into N reflection wave reception signals, M×N reception signals are obtained by the matched filter banks 5-1 to 5-M.

The correlation matrix calculating unit 6 calculates an unnecessary signal correlation matrix Rc using a steering vector of an unnecessary signal defined on the basis of a DOD angle of the unnecessary signal and a DOA angle of the unnecessary signal.

For example, the correlation matrix calculating unit 6 determines an area where achievement of reduction of side lobes is desired from a bidirectional beam pattern described later with reference to FIG. 2. The correlation matrix calculating unit 6 determines a steering vector of an unnecessary signal corresponding to the determined area by setting a DOD angle belonging to the determined area as a DOD angle of an unnecessary signal and setting a DOA angle belonging to the determined area as a DOA angle of the unnecessary signal. After determining all the steering vectors of unnecessary signals corresponding to the determined area, the correlation matrix calculating unit 6 calculates an unnecessary signal correlation matrix Rc using the determined steering vectors.

The diagonal load processing unit 7 performs diagonal load processing on the unnecessary signal correlation matrix Rc calculated by the correlation matrix calculating unit 6 using a diagonal load amount ε, and calculates an unnecessary signal correlation matrix R after the diagonal load processing. For example, the diagonal load processing unit 7 calculates the unnecessary signal correlation matrix R by adding a diagonal load amount ε to the unnecessary signal correlation matrix Rc.

The window function calculating unit 8 calculates a window function for obtaining a side lobe characteristic that reduces unnecessary signals on the basis of the unnecessary signal correlation matrix R after the diagonal load processing, input by the diagonal load processing unit 7. For example, the window function calculating unit 8 determines a vector corresponding to a value of the window function from the unnecessary signal correlation matrix R, and calculates a diagonal matrix $T_w$ having the value of the window function as a diagonal component.

The window function applying unit 9 multiplies a reception signal vector input from the M matched filter banks 5-1 to 5-M by the window function calculated by the window function calculating unit 8, and outputs a reception signal vector to which the window function is applied. For example, the window function applying unit 9 applies the window function to a reception signal vector by determining $T_w x$ obtained by multiplying the reception signal vector by a diagonal matrix $T_w$.

The beam forming unit 10 forms a MIMO beam on the basis of the reception signal vector input from the window function applying unit 9 and a beam directivity angle. For example, the beam forming unit 10 obtains a MIMO beam output by performing MIMO beam forming on a reception signal vector using a beam weight for a beam directivity angle.

Next, a bidirectional beam pattern in the radar device 1 which is a MIMO radar device will be described. A steering vector in the radar device 1 is represented by the following formula (1).

Hereinafter, the steering vector in the radar device 1 is referred to as a MIMO steering vector $a(u_T, u_R)$. In the following formula (1), $a_T(u_T)$ is a transmission steering vector, and $u_T$ is a direction cosine corresponding to a DOD angle. $a_R(u_R)$ is a reception steering vector, and $u_R$ is a direction cosine corresponding to a DOA angle.

$$a(u_T, u_R) = a_T(u_T) \otimes a_R(u_R) \quad (1)$$

Without loss of generality, in a case where a beam directivity angle $u_0$ in a MIMO radar device is set to a boresight direction ($u_0=0$), a MIMO beam weight $w_0$ can be determined by the following formula (2).

$$w_0 = a(0, 0) \qquad (2)$$
$$= a_T(0) \otimes a_R(0)$$

In order to achieve reduction of side lobes in a transmission beam pattern and a reception beam pattern, for example, when a diagonal matrix having a value of a window function such as a Hamming window as a diagonal component is represented by $T_T$ or $T_R$, the MIMO beam weight $w_0$ is determined by the following formula (3).

$$w_0 = T_T a_T(0) \otimes T_R a_R(0) \qquad (3)$$
$$= (T_T \otimes T_R)(a_T(0) \otimes a_R(0))$$

A MIMO beam response $y(u_T, u_R)$ is calculated by the following formula (4). Note that $\alpha$ determined by the following formula (5) is a normalization coefficient for keeping a white noise gain constant. A transmission beam response $y_T(u_T)$ in the following formula (4) is determined by the following formula (6), and a reception beam response $y_R(u_R)$ in the following formula (4) is determined by the following formula (7).

$$y(u_T, u_R) = \alpha w_0^H a(u_T, u_R) \qquad (4)$$
$$= \alpha((T_T \otimes T_R)(a_T(0) \otimes a_R(0)))^H (a_T(u_T) \otimes a_R(u_R))$$
$$= \alpha(a_T(0) \otimes a_R(0))^H (T_T \otimes T_R)^H (a_T(u_T) \otimes a_R(u_R))$$
$$= \alpha(a_T^H(0) \otimes a_R^H(0))(T_T^H \otimes T_R^H)(a_T(u_T) \otimes a_R(u_R))$$
$$= \alpha(a_T^H(0)T_T^H \otimes a_R^H(0)T_R^H)(a_T(u_T) \otimes a_R(u_R))$$
$$= \alpha a_T^H(0)T_T^H a_T(u_T) \cdot a_R^H(0)T_R^H a_R(u_R)$$
$$= \alpha y_T(u_T) \cdot y_R(u_R)$$

$$\alpha = \left(\sqrt{(a_T(0) \otimes a_R(0))^H (T_t \otimes T_R)^H (a_T(0) \otimes a_R(0))}\right)^{-1} \qquad (5)$$
$$= \left(\sqrt{(a_T^H(0)T_T a_T(0) \cdot a_R^H(0)T_R a_R(0))}\right)^{-1}$$

$$y_T(u_T) = a_T^H(0)T_T^H a_T(u_T) \qquad (6)$$

$$y_R(u_R) = a_R^H(0)T_R^H a_R(u_R) \qquad (7)$$

A bidirectional beam pattern $B(u_T, u_R)$ in the radar device 1 is determined by the following formula (8). As illustrated in the following formula (8), the bidirectional beam pattern $B(u_T, u_R)$ can be decomposed into a transmission beam pattern $|y_T(u_T)|^2$ and a reception beam pattern $|y_R(u_R)|^2$, and the bidirectional beam pattern $B(u_T, u_R)$ is represented by a product of the beam patterns.

Since $u_T$ and $u_R$ are independent variables independent of each other, the bidirectional beam pattern $B(u_T, u_R)$ is evaluated in a two-dimensional map defined by $u_T$ and $u_R$.

$$B(u_T, u_R) = \alpha^2 |y_T(u_T) \cdot y_R(u_R)|^2$$
$$= \alpha^2 |y_T(u_T)|^2 |y_R(u_R)|^2 \qquad (8)$$

Figure 2:
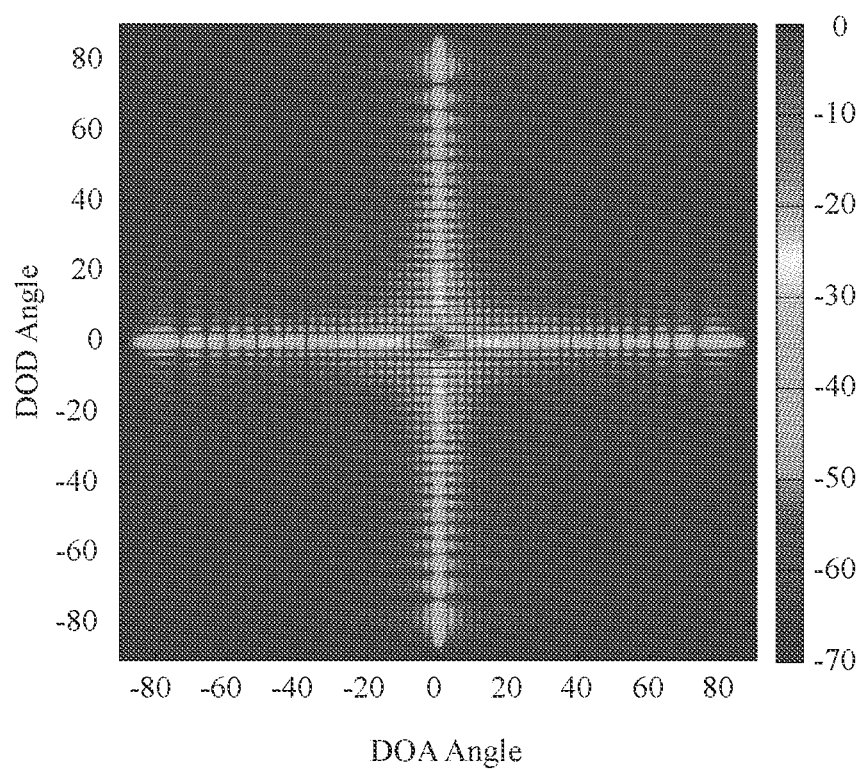
FIG. 2 is a diagram illustrating an example of a bidirectional beam pattern in the radar device according to the first embodiment.

FIG. 2 is a diagram illustrating an example of a bidirectional beam pattern in the radar device 1. As illustrated in FIG. 2, the bidirectional beam pattern can be represented by a two-dimensional map defined by a direction cosine $u_T$ corresponding to a DOD angle and a direction cosine $u_R$ corresponding to a DOA angle. A conventional MIMO beam pattern has a characteristic that a DOD angle and a DOA angle are the same, and has a characteristic on the diagonal line extending from the lower left side to the upper right side in FIG. 2.

On the other hand, the bidirectional beam pattern in the radar device 1 can capture a side lobe level under a condition that a DOD angle and a DOA angle are different from each other, not clarified only by the conventional MIMO beam pattern. In particular, a side lobe level around a main beam area indicated in the center of FIG. 2 is higher than a side lobe level in the conventional MIMO beam pattern.

Next, the MIMO steering vector will be described.

When a beam directivity angle in the radar device 1 is represented by $u_0$, a direction cosine $u_T$ corresponding to a DOD angle can be represented by the following formula (9), and a direction cosine $u_R$ corresponding to a DOA angle can be represented by the following formula (10). In the following formulas (9) and (10), $\Delta u_T$ is an offset angle of a DOD angle based on a beam directivity angle $u_0$, and $\Delta u_R$ is an offset angle of a DOA angle based on the beam directivity angle $u_0$.

$$u_T = u_0 + \Delta u_T \qquad (9)$$

$$u_R = u_0 + \Delta u_R \qquad (10)$$

A transmission steering vector $a_T(u_T)$ can be represented by the following formula (11), and a reception steering vector $a_R(u_R)$ can be represented by the following formula (12). Note that in the following formulas (11) and (12), $D_T(u_0) = \text{diag}\{a_T(u_0)\}$ and $D_R(u_0) = \text{diag}\{a_R(u_0)\}$ are satisfied.

$$a_T(u_T) = \text{diag}\{a_T(u_0)\} a_T(\Delta u_T)$$
$$= D_T(u_0) a_T(\Delta u_T) \qquad (11)$$

$$a_R(u_R) = \text{diag}\{a_R(u_0)\} a_R(\Delta u_R)$$
$$= D_R(u_0) a_R(\Delta u_R) \qquad (12)$$

As a result, the MIMO steering vector $a(u_T, u_R)$ can be represented by the following formula (13). As illustrated in the following formula (13), $a(u_T, u_R)$ is determined as a matrix product of a matrix $D(u_0)$ determined by a steering vector based on a beam directivity angle $u_0$ and a MIMO steering vector $a(\Delta u_T, \Delta u_R)$ based on offset angles $\Delta u_T$ and $\Delta u_R$.

$$a(u_T, u_R) = D_T(u_0) a_T(\Delta u_T) \otimes D_R(u_0) a_R(\Delta u_R) \qquad (13)$$
$$= (D_T(u_0) \otimes D_R(u_0))(a_T(\Delta u_T) \otimes a_R(\Delta u_R))$$
$$= (D_T(u_0) \otimes D_R(u_0)) a(\Delta u_T, \Delta u_R)$$
$$= D(u_0) a(\Delta u_T, \Delta u_R)$$

$$D(u_0) = D_T(u_0) \otimes D_R(u_0)$$

Figure 3A:
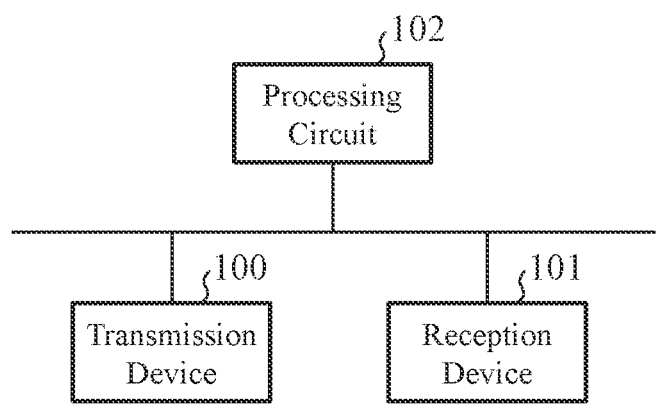
FIG. 3A is a block diagram illustrating a hardware configuration for implementing a function of the radar device according to the first embodiment.
Figure 3B:
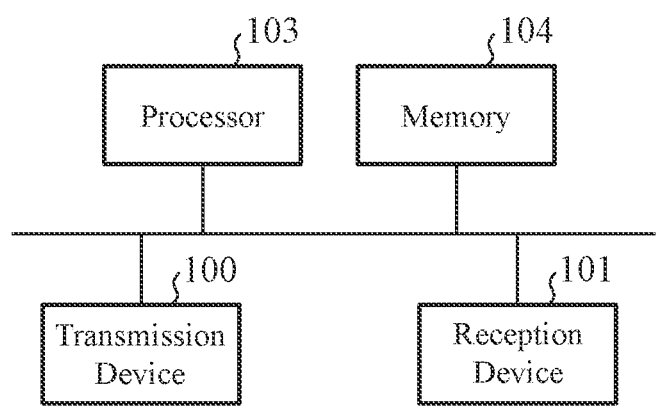
FIG. 3B is a block diagram illustrating a hardware configuration for executing software for implementing the function of the radar device according to the first embodiment.

FIG. 3A is a block diagram illustrating a hardware configuration for implementing a function of the radar device 1. FIG. 3B is a block diagram illustrating a hardware configuration for executing software for implementing the function of the radar device 1. In FIGS. 3A and 3B, a transmission device 100 includes the transmission antennas 2-1 to 2-N and the transmission signal generating units 3-1 to 3-N illustrated in FIG. 1. A Reception device 101 includes the reception antennas 4-1 to 4-M and the matched filter banks 5-1 to 5-M illustrated in FIG. 1.

Each of functions of the correlation matrix calculating unit 6, the diagonal load processing unit 7, the window function calculating unit 8, the window function applying unit 9, and the beam forming unit 10 in the radar device 1 is implemented by a processing circuit.

That is, the radar device 1 includes a processing circuit for executing processes in steps ST1 to ST5 described later with reference to FIG. 4.

The processing circuit may be dedicated hardware or a central processing unit (CPU) for executing a program stored in a memory.

In a case where the processing circuit is a processing circuit 102 of dedicated hardware illustrated in FIG. 3A, for example, a single circuit, a composite circuit, a programmed processor, a parallel programmed processor, an application specific integrated circuit (ASIC), a field-programmable gate array (FPGA), or a combination thereof corresponds to the processing circuit 102. The functions of the correlation matrix calculating unit 6, the diagonal load processing unit 7, the window function calculating unit 8, the window function applying unit 9, and the beam forming unit 10 may be implemented by separate processing circuits, respectively, or may be collectively implemented by a single processing circuit.

In a case where the processing circuit is a processor 103 illustrated in FIG. 3B, each of the functions of the correlation matrix calculating unit 6, the diagonal load processing unit 7, the window function calculating unit 8, the window function applying unit 9, and the beam forming unit 10 is implemented by software, firmware, or a combination of software and firmware. The software or the firmware is described as a program and stored in a memory 104.

The processor 103 reads and executes a program stored in the memory 104, and thereby implements each of the functions of the correlation matrix calculating unit 6, the diagonal load processing unit 7, the window function calculating unit 8, the window function applying unit 9, and the beam forming unit 10. That is, the radar device 1 includes the memory 104 for storing a program that causes processes in steps ST1 to ST5 illustrated in FIG. 4 to be executed as a result when the program is executed by the processor 103.

The program causes a computer to execute procedures or methods of the correlation matrix calculating unit 6, the diagonal load processing unit 7, the window function calculating unit 8, the window function applying unit 9, and the beam forming unit 10. The memory 104 may be a computer-readable storage medium storing a program for causing a computer to function as the correlation matrix calculating unit 6, the diagonal load processing unit 7, the window function calculating unit 8, the window function applying unit 9, and the beam forming unit 10.

To the memory 104, for example, a nonvolatile or volatile semiconductor memory such as random access memory (RAM), read only memory (ROM), a flash memory, erasable programmable read only memory (EPROM), or electrically-EPROM (EEPROM); a magnetic disk, a flexible disk, an optical disc, a compact disc, a mini disc, a digital versatile disk (DVD), or the like corresponds.

Some of the functions of the correlation matrix calculating unit 6, the diagonal load processing unit 7, the window function calculating unit 8, the window function applying unit 9, and the beam forming unit 10 may be implemented by dedicated hardware, and some of the functions may be implemented by software or firmware. For example, the functions of the correlation matrix calculating unit 6, the diagonal load processing unit 7, and the window function calculating unit 8 are implemented by a processing circuit as dedicated hardware. The functions of the window function applying unit 9 and the beam forming unit 10 may be implemented by causing the processor 103 to read and execute a program stored in the memory 104. As described above, the processing circuit can implement each of the above functions by hardware, software, firmware, or a combination thereof.

Next, the operation will be described.

Figure 4:
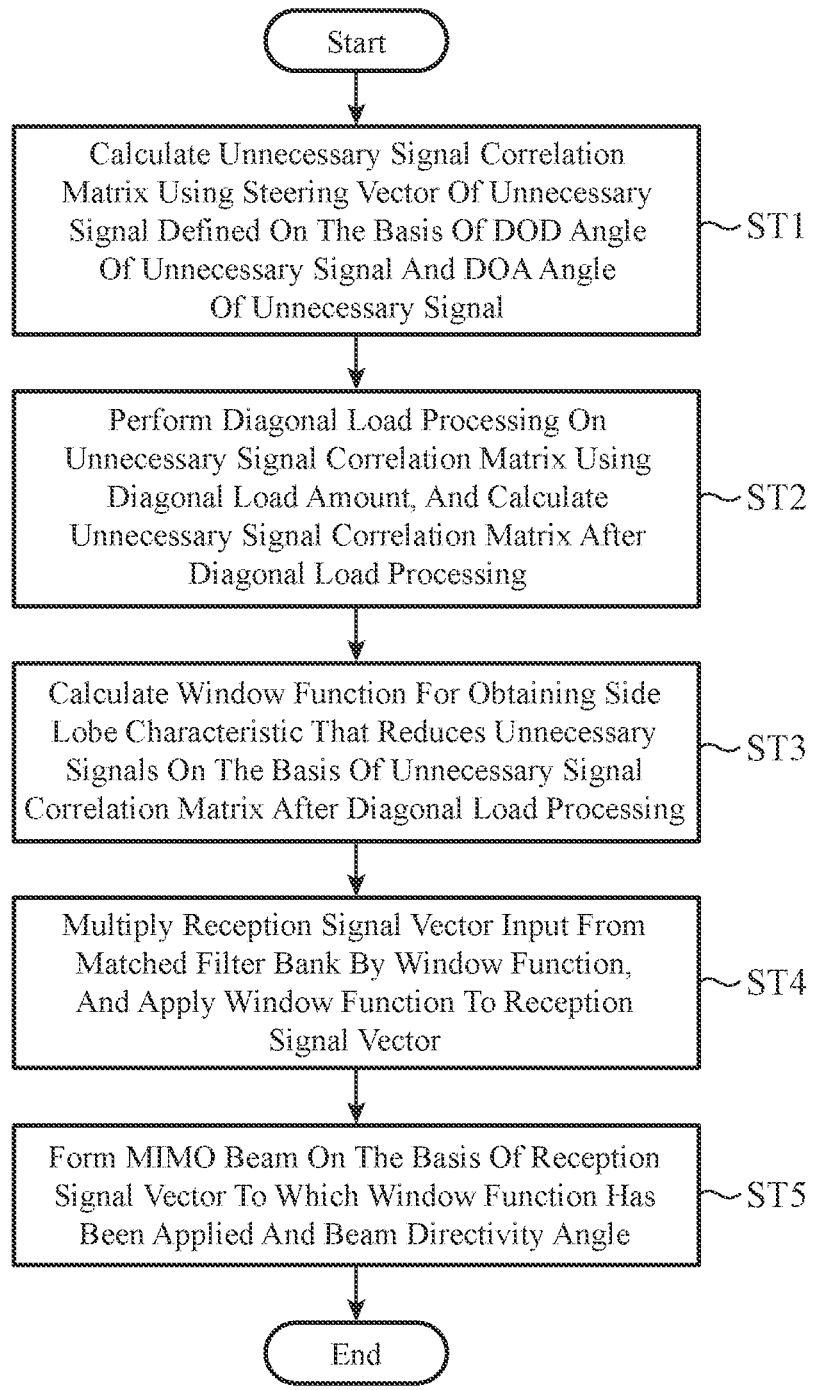
FIG. 4 is a flowchart illustrating operation of the radar device according to the first embodiment.

FIG. 4 is a flowchart illustrating operation of the radar device 1, and illustrates a series of processes until a signal processing unit of the radar device 1 obtains a MIMO radar output.

The correlation matrix calculating unit 6 calculates an unnecessary signal correlation matrix Rc using a steering vector of an unnecessary signal defined on the basis of a DOD angle of the unnecessary signal and a DOA angle of the unnecessary signal (step ST1). For example, the correlation matrix calculating unit 6 determines an area where achievement of reduction of side lobes is desired from a bidirectional beam pattern without consideration of a window function, illustrated in FIG. 2.

Figure 5:
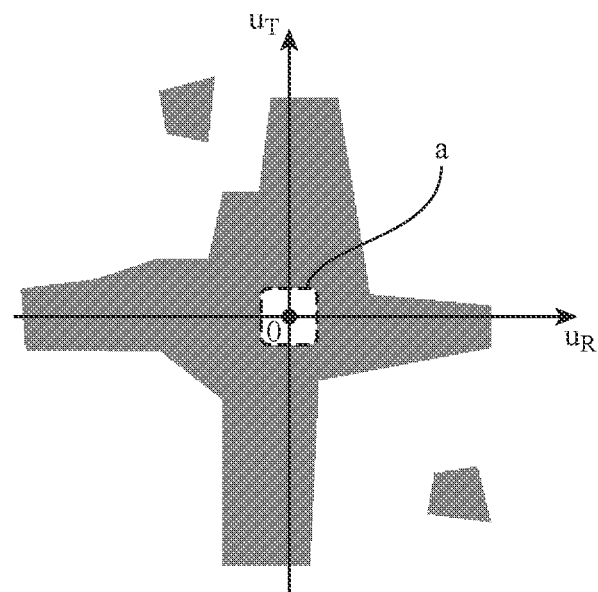
FIG. 5 is a diagram illustrating an example of an area where achievement of reduction of side lobes is desired in a bidirectional beam pattern.
Figure 6:
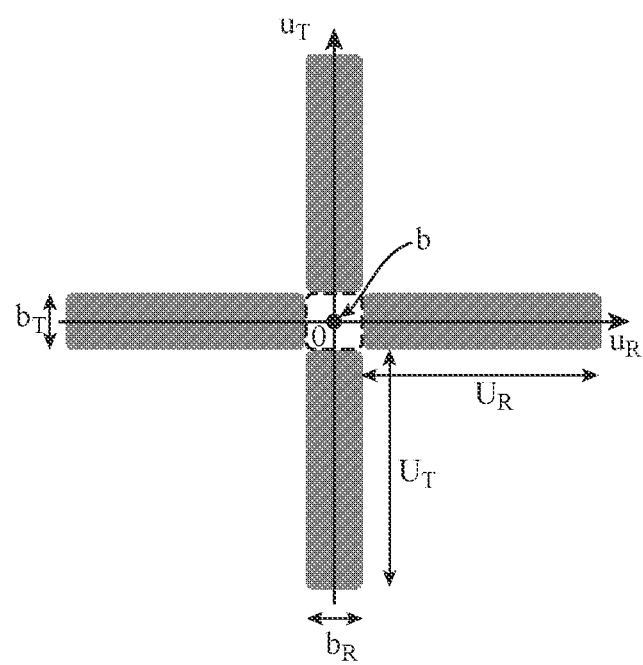
FIG. 6 is a diagram illustrating another example of the area where achievement of reduction of side lobes is desired in the bidirectional beam pattern.

FIG. 5 is a diagram illustrating an example of an area where achievement of reduction of side lobes is desired in a bidirectional beam pattern. FIG. 6 is a diagram illustrating another example of the area where achievement of reduction of side lobes is desired in the bidirectional beam pattern. In FIG. 5, a gray area present around a main beam area a including a beam directing direction is an area where achievement of reduction of side lobes is desired. As described above, the area where achievement of reduction of side lobes is desired is an area having an arbitrary shape.

Therefore, for simplicity of description, a case where the area where achievement of reduction of side lobes is desired is determined as the gray area in FIG. 6 will be described as an example. Note that an area b is a main beam area including a beam directing direction. The gray area in FIG. 6 corresponds to propagation in which a DOD angle falls within a main beam and a DOA angle falls within a side lobe, or propagation in which the DOD angle falls within the side lobe and the DOA angle falls within the main beam. This area will be referred to as an MS/SM propagation side lobe area. MS is an abbreviation of Mainbeam-to-Sidelobe, and SM is an abbreviation of Sidelobe-to-Mainbeam.

In FIG. 6, $b_T$, $b_R$, $U_T$, and $U_R$ are parameters that determine a region of a DOD angle of an unnecessary signal and a DOA angle of the unnecessary signal in the MS/SM propagation side lobe area. At this time, an unnecessary signal correlation matrix Rc can be represented by the following formula (14). Note that average power of an unnecessary signal is assumed to be unit power without loss of generality.

$$R_c = \int_{-U_R}^{-0.5b_R} \int_{-0.5b_T}^{+0.5b_T} a(\Delta u_T, \Delta u_R) a^H(\Delta u_T, \Delta u_R) d\Delta u_T d\Delta u_R + \\ \int_{-0.5b_R}^{-U_R} \int_{-0.5b_T}^{-0.5b_T} a(\Delta u_T, \Delta u_R) a^H(\Delta u_T, \Delta u_R) d\Delta u_T d\Delta u_R + \\ \int_{-0.5b_R}^{-0.5b_R} \int_{-U_T}^{-0.5b_T} a(\Delta u_T, \Delta u_R) a^H(\Delta u_T, \Delta u_R) d\Delta u_T d\Delta u_R + \\ \int_{-0.5b_R}^{-0.5b_R} \int_{-0.5b_T}^{-U_T} a(\Delta u_T, \Delta u_R) a^H(\Delta u_T, \Delta u_R) d\Delta u_T d\Delta u_R \quad (14)$$

Since the area where achievement of reduction of side lobes is desired is a part of an angle region defined by a DOD angle and a DOA angle as illustrated in FIG. 5 or 6, the unnecessary signal correlation matrix Rc clearly has a low rank structure. That is, the area where achievement of reduction of side lobes is desired constitutes a subspace of a space where a MIMO steering vector is present.

Return to the description of FIG. 4. The diagonal load processing unit 7 performs diagonal load processing on the unnecessary signal correlation matrix Rc using a diagonal load amount $\varepsilon$, and calculates an unnecessary signal correlation matrix R after the diagonal load processing (step ST2). For example, the diagonal load processing unit 7 determines the unnecessary signal correlation matrix R after the diagonal load processing by adding the diagonal load amount $\varepsilon$ to the unnecessary signal correlation matrix Rc according to the following formula (15). The diagonal load amount $\varepsilon$ virtually models a receiver noise matrix, and average power of an unnecessary signal is assumed to be unit power. Therefore, the diagonal load amount $\varepsilon$ is set so as to satisfy $0<\varepsilon<<1$. In the following formula (15), I is a unit matrix.

$$R = Rc + \varepsilon I \quad (15)$$

The window function calculating unit 8 calculates a window function for obtaining a side lobe characteristic that reduces unnecessary signals on the basis of the unnecessary signal correlation matrix R after the diagonal load processing (step ST3). For example, the window function calculating unit 8 determines the window function for obtaining a side lobe characteristic that reduces unnecessary signals according to the following formula (16). Here, 1 is a vector whose vector elements are all 1. $R^{-1}1$ is a vector based on a value of the window function, and $T_W$ is a diagonal matrix having the value of the window function as a diagonal component.

$$T_W = \text{diag}(R^{-1}1) \quad (16)$$

The transmission antennas 2-1 to 2-N transmit transmission signals generated by the transmission signal generating units 3-1 to 3-N, respectively. The transmission signals transmitted from the transmission antennas 2-1 to 2-N hit an object, and reflection waves thereof are received by the M reception antennas 4-1 to 4-M.

A reception signal received by each of the reception antennas 4-1 to 4-M includes a mixture of reflection waves derived from N transmission signals. Each of the matched filter banks 5-1 to 5-M separates a reception signal into N reflection wave reception signals using N transmission signals generated by the transmission signal generating units 3-1 to 3-N, respectively, as a replica of a matched filter.

As described above, since a reception signal received by one matched filter bank is separated into N reflection wave reception signals, M×N reception signals are obtained by the matched filter banks 5-1 to 5-M. A vector including these M×N reception signals as vector elements is referred to as a reception signal vector x.

The window function applying unit 9 multiplies a reception signal vector x input from the matched filter banks 5-1 to 5-M by a window function calculated by the window function calculating unit 8, and outputs a reception signal vector to which the window function is applied (step ST4). For example, the window function applying unit 9 obtains a reception signal vector $T_W x$ after application of the window function by multiplying the reception signal vector x by a diagonal matrix $T_W$ having a value of the window function as a diagonal component.

The beam forming unit 10 forms a MIMO beam on the basis of the reception signal vector $T_W x$ input from the window function applying unit 9 and a beam directivity angle $u_0$ (step ST5). For example, the beam forming unit 10 performs beam forming on the reception signal vector $T_W x$ after application of the window function on the basis of the following formula (17) using a beam weight $a(u_0,u_0)$ for the beam directivity angle $u_0$, and obtains a MIMO beam output y.

$$y = a(u_0,u_0)^H T_W x \quad (17)$$

As described above, in the radar device 1 according to the first embodiment, the correlation matrix calculating unit 6 calculates an unnecessary signal correlation matrix Rc using a steering vector of an unnecessary signal defined on the basis of a DOD angle of the unnecessary signal and a DOA angle of the unnecessary signal. In particular, the correlation matrix calculating unit 6 defines a steering vector of an unnecessary signal on the basis of a DOD angle and a DOA angle of the unnecessary signal in an MS/SM propagation side lobe area, and calculates the unnecessary signal correlation matrix Rc. The diagonal load processing unit 7 performs diagonal load processing on the unnecessary signal correlation matrix Rc. The window function calculating unit 8 calculates a window function for obtaining a side lobe characteristic that reduces unnecessary signals on the basis of the unnecessary signal correlation matrix R after the diagonal load processing. The window function applying unit 9 applies the window function to the reception signal vector input from the matched filter banks 5-1 to 5-M. The beam forming unit 10 forms a MIMO beam on the basis of the reception signal vector to which the window function is applied and a beam directivity angle.

As a result, the window function is derived on the basis of a principle of suppressing reflection signals (unnecessary signals) belonging to a subspace of a space defined by steering vectors of direct propagation clutters and multipath clutters. By using this window function, the radar device 1 can reduce direct propagation clutters and multipath clutters included in a reception signal.

Note that the present invention is not limited to the above embodiment, and any component in the embodiment can be modified, or any component in the embodiment can be omitted within the scope of the present invention.

INDUSTRIAL APPLICABILITY

The radar device according to the present invention can reduce direct propagation clutters and multipath clutters included in a reception signal, and therefore can be used for various radar devices.

REFERENCE SIGNS LIST

1: Radar device, 2-1 to 2-N: Transmission antenna, 3-1 to 3-N: Transmission signal generating unit, 4-1 to 4-M: Reception antenna, 5-1 to 5-M: Matched filter bank, 6: Correlation matrix calculating unit, 7: Diagonal load processing unit, 8: Window function calculating unit, 9: Window function applying unit, 10: Beam forming unit, 100: Transmission device, 101: Reception device, 102: Processing circuit, 103: Processor, 104: Memory

The invention claimed is:
1. A radar device comprising:
N transmission signal generators to generate transmission signals different from each other, wherein N indicates two or more;

N transmission antennas to transmit a transmission signal by being connected to the N transmission signal generators one by one;

M reception antennas to receive reflection waves of the transmission signals transmitted from the N transmission antennas, the reflection waves being formed by reflection off an object, wherein M indicates two or more;

M matched filter banks to each output a reception signal vector that is an output of a matched filter using a transmission signal generated by each of the N transmission signal generators as a replica of the matched filter by being connected to the M reception antennas one by one;

a correlation matrix calculator to calculate an unnecessary signal correlation matrix using a steering vector of an unnecessary signal defined on a basis of a transmission angle of the unnecessary signal and an arrival angle of the unnecessary signal;

a diagonal load processor to perform diagonal load processing on the unnecessary signal correlation matrix calculated by the correlation matrix calculator using a diagonal load amount, and calculating an unnecessary signal correlation matrix after the diagonal load processing;

a window function calculator to calculate a window function for obtaining a side lobe characteristic that reduces unnecessary signals on a basis of the unnecessary signal correlation matrix after the diagonal load processing calculated by the diagonal load processor;

a window function applier to multiply the reception signal vector output from the M matched filter banks by the window function calculated by the window function calculator, and outputting the reception signal vector to which the window function is applied; and a beam former to form a multiple input multiple output beam on a basis of the reception signal vector output from the window function applier and a beam directivity angle.

2. The radar device according to claim 1, wherein the correlation matrix calculator defines the steering vector of the unnecessary signal on a basis of the transmission angle and the arrival angle of the unnecessary signal in a side lobe area corresponding to propagation in which the transmission angle falls within a main beam and the arrival angle falls within a side lobe, or propagation in which the transmission angle falls within the side lobe and the arrival angle falls within the main beam, and calculates an unnecessary signal correlation matrix.

* * * * *